US008959519B2

(12) United States Patent
Agarwal et al.

(10) Patent No.: US 8,959,519 B2
(45) Date of Patent: *Feb. 17, 2015

(54) PROCESSING HIERARCHICAL DATA IN A MAP-REDUCE FRAMEWORK

(75) Inventors: Manoj K. Agarwal, Noida (IN); Himanshu Gupta, New Delhi (IN); Rajeev Gupta, Noida (IN); Sriram K. Padmanabhan, San Jose, CA (US); Prasan Roy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 337 days.

This patent is subject to a terminal disclaimer.

(21) Appl. No.: 13/598,280

(22) Filed: Aug. 29, 2012

(65) Prior Publication Data

US 2012/0324459 A1 Dec. 20, 2012

Related U.S. Application Data

(63) Continuation of application No. 13/118,628, filed on May 31, 2011, now Pat. No. 8,677,366.

(51) Int. Cl.
*G06F 9/46* (2006.01)
(52) U.S. Cl.
CPC .......................................... *G06F 9/46* (2013.01)
USPC ........................................ 718/102; 718/100
(58) Field of Classification Search
None
See application file for complete search history.

(56) References Cited

U.S. PATENT DOCUMENTS

| | | | |
|---|---|---|---|
| 2010/0332459 A1 | 12/2010 | Yanai et al. | |
| 2012/0144185 A1* | 6/2012 | Raykova et al. | 713/150 |
| 2012/0226639 A1* | 9/2012 | Burdick et al. | 706/12 |
| 2012/0304186 A1* | 11/2012 | Balmin et al. | 718/103 |
| 2014/0019987 A1* | 1/2014 | Verma et al. | 718/103 |
| 2014/0026147 A1* | 1/2014 | Cherkasova et al. | 718/105 |

OTHER PUBLICATIONS

Aarnio, Tomi, "Parallel data processing with MapReduce", 7 pages, available at http://www.cse.tkk.fi/en/publications/B/5/papers/Aarnio_final.pdf, as of Apr. 21, 2011.

Zinn, et al., "Parallelizing XML Processing Pipelines via MapReduce", 12 pages, available at http://www.cs.ucdavis.edu/research/tech-reports/2009/CSE-2009-12.pdf, as of Apr. 21, 2011.

Dean, J., et al., "MapReduce: Simplified Data Processing on Large Clusters", Google, Inc., 6th Symposium on Operating System Design and Implementation (OSDI 2004), Dec. 6-8, 2004, San Francisco, California.

* cited by examiner

*Primary Examiner* — Kenneth Tang
(74) *Attorney, Agent, or Firm* — Ference & Associates LLC (57) ABSTRACT

Methods and arrangements for processing hierarchical data in a map-reduce framework. Hierarchical data is accepted, and a map-reduce job is performed on the hierarchical data. This performing of a map-reduce job includes determining a cost of partitioning the data, determining a cost of redefining the job and thereupon selectively performing at least one step taken from the group consisting of: partitioning the data and redefining the job.

12 Claims, 5 Drawing Sheets

PROCESSING HIERARCHICAL DATA IN A MAP-REDUCE FRAMEWORK

CROSS REFERENCE TO RELATED APPLICATION

This application is a continuation of U.S. patent application Ser. No. 13/118,628, entitled SYSTEMS AND METHODS FOR PROCESSING HIERARCHICAL DATA IN A MAP-REDUCE FRAMEWORK, filed on May 31, 2011, which is incorporated by reference in its entirety.

BACKGROUND

Various web applications can generate immense amounts of semi-structured hierarchical data, with JSON (JavaScript Object Notation) and XML (Extensible Markup Language) being typical default data models to exchange information across the web. The data is often processed later for various business analytics purposes. The map-reduce framework has been developed to provide a tool for processing massive amounts of data. Map-reduce is a parallel-processing, shared-nothing architecture (i.e., distributed computing architecture with each node essentially being independent and self-sufficient), with data-shuffling. (Background information on map-reduce architecture, which may be employed by way of better understanding a context of at least one embodiment of the invention, may be found in Dean, J., and Ghemawat, S., "MapReduce: Simplified Data Processing on Large Clusters", Google, Inc., OSDI 2004 (6th Symposium on Operating System Design and Implementation, San Francisco, Calif.); available via http://labs.google.com/papers/mapreduce-osdiO4.pdf.

However, it has been found that processing hierarchical data in a map-reduce framework can be difficult and present obstacles to efficient operation. Particularly, it needs to be ensured that full parallelism and independent functioning among maps (a processing unit with a block of input data) is in place for producing key-value pairs to be processed by different map instances. If input data is such that input to the map function (a key-value pair) can be generated independently, then many difficulties can be averted. Without an effective arrangement to process hierarchical input data, conventional map-reduce frameworks can become highly unsatisfactory in their performance.

BRIEF SUMMARY

In summary, one aspect of the invention provides a method comprising: accepting hierarchical data; performing a map-reduce job on the hierarchical data; the performing comprising: determining a cost of partitioning the data; determining a cost of redefining the job; thereupon selectively performing at least one step taken from the group consisting of: partitioning the data and redefining the job.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
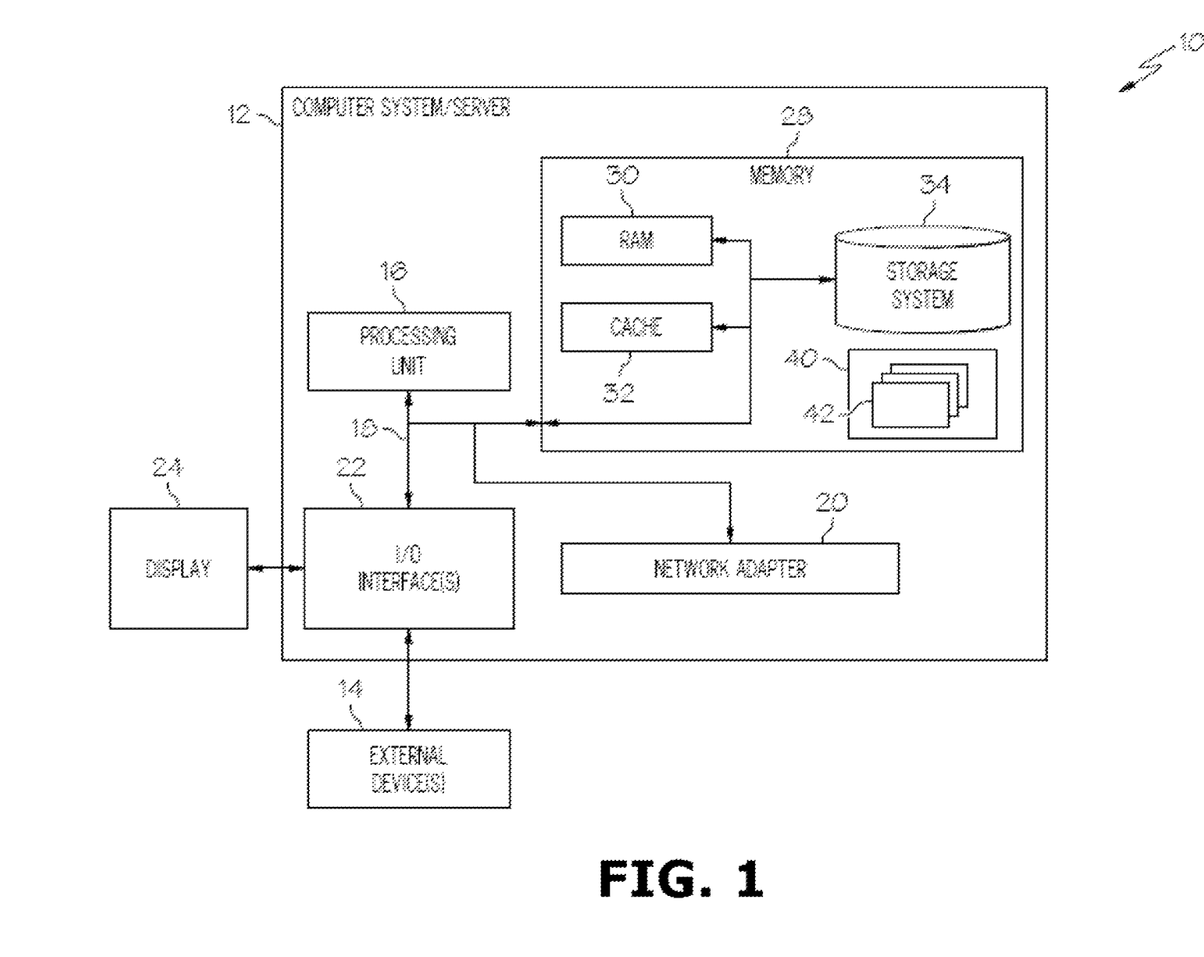
FIG. 1 illustrates a computer system.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, at least one processor or processing unit 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, at least one application program, other program modules, and program data. Each of the operating system, at least one application program, other program modules, and program data or some combination thereof, may include an implementation of a networking environment. Program modules 42 generally carry out the functions and/or methodologies of embodiments of the invention as described herein.

Computer system/server 12 may also communicate with at least one external device 14 such as a keyboard, a pointing device, a display 24, etc.; at least one device that enable a user to interact with computer system/server 12; and/or any devices (e.g., network card, modem, etc.) that enable computer system/server 12 to communicate with at least one other computing device. Such communication can occur via I/O interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
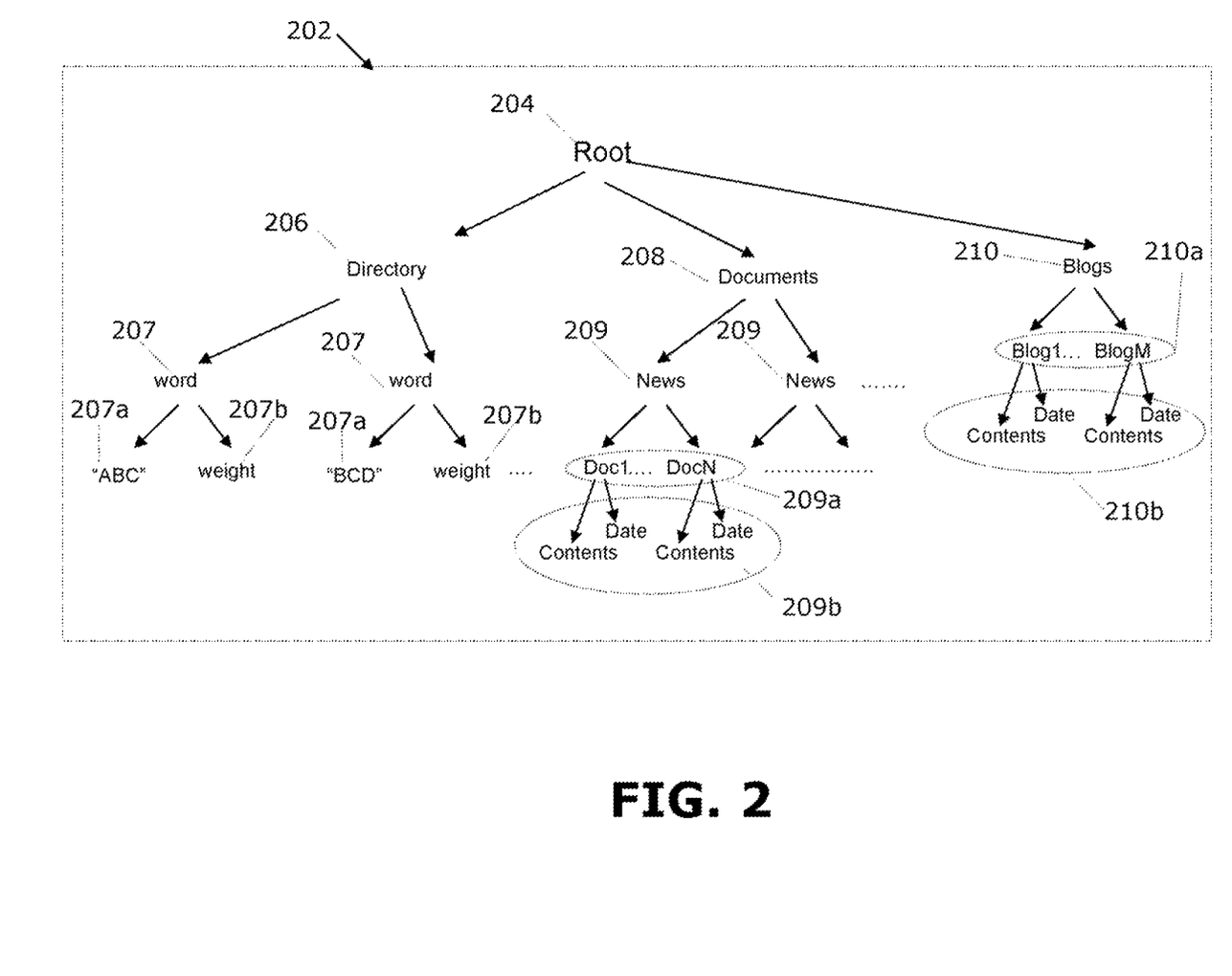
FIG. 2 provides a graph of a sample semi-structured document.
Figure 3:
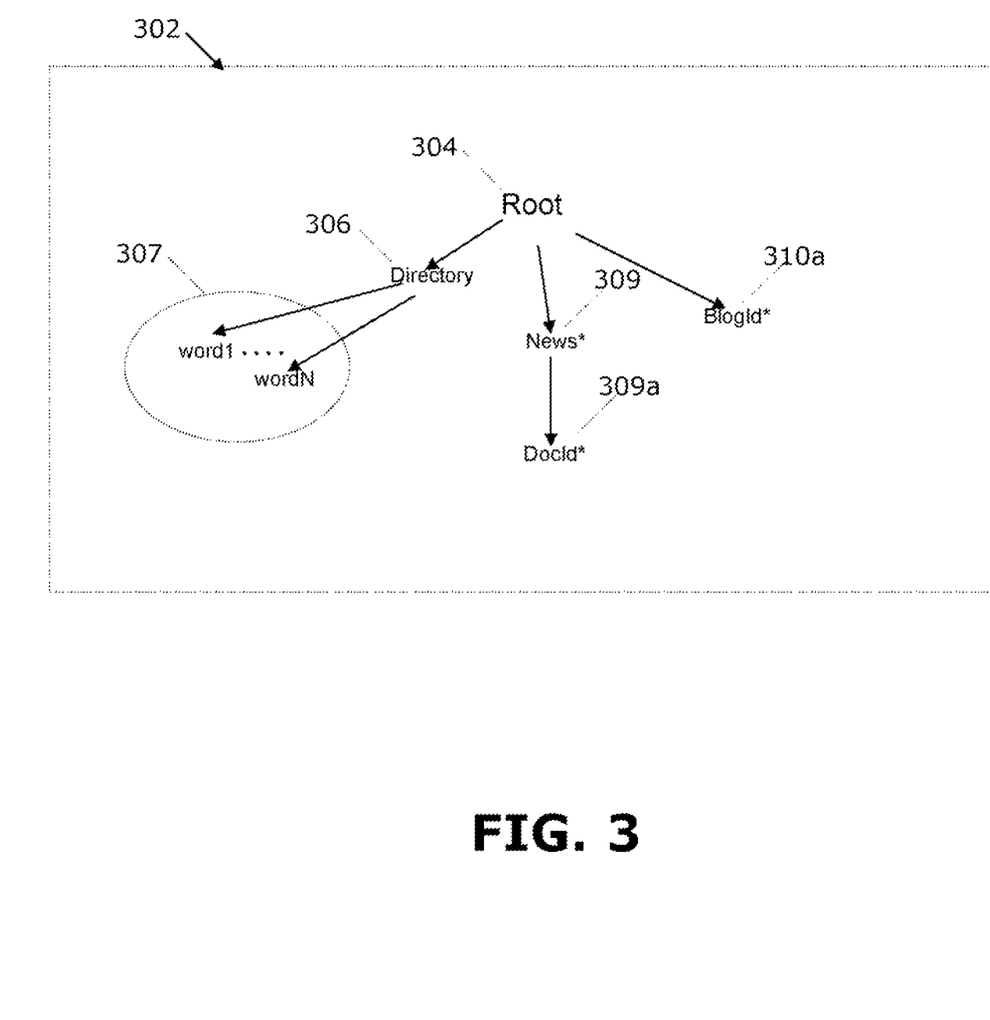
FIG. 3 provides a graph of a general sample map-reduced hierarchical data scheme.
Figure 4:
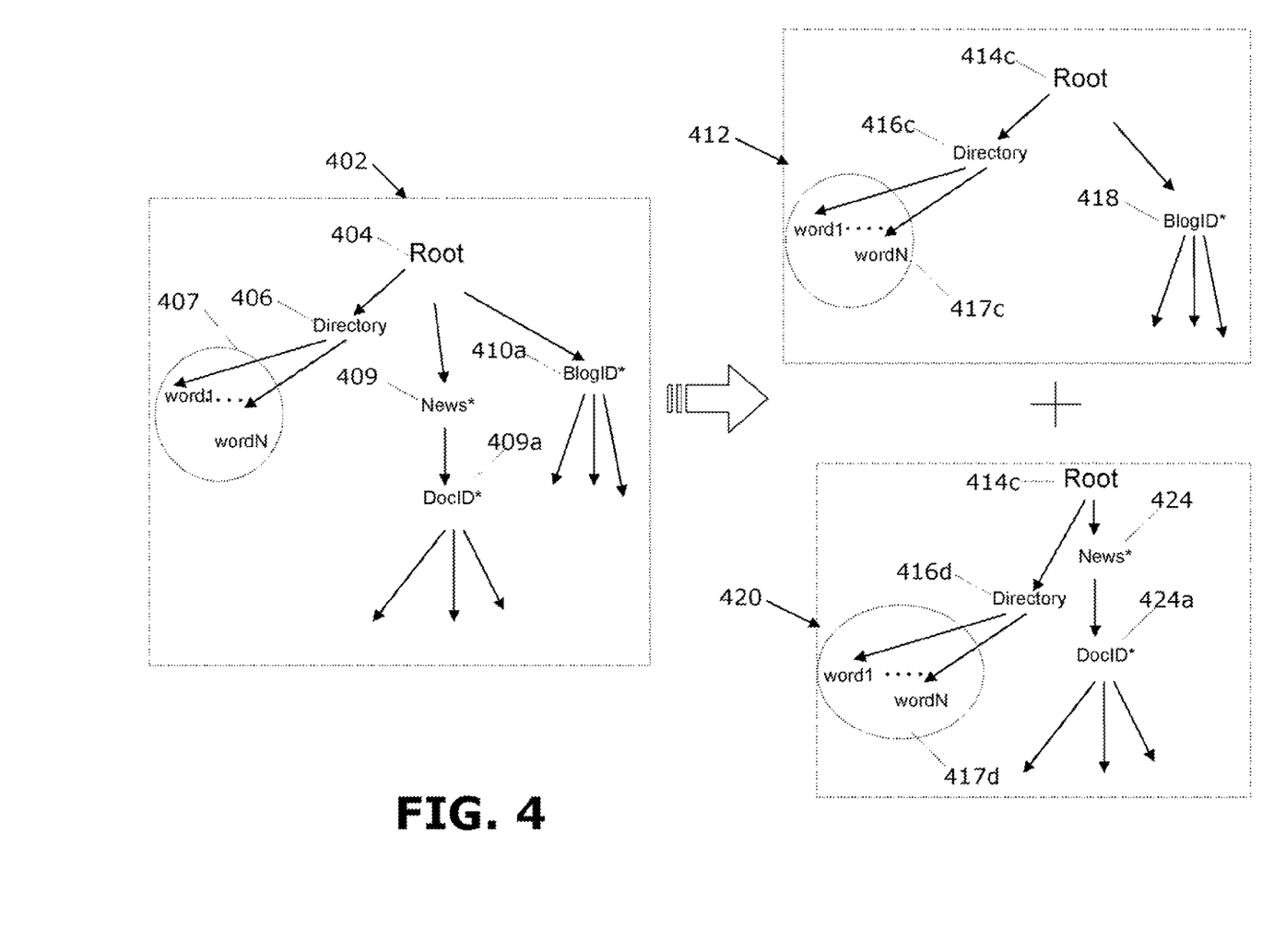
FIG. 4 graphically illustrates a partitioning of a hierarchical data scheme.

The disclosure now turns to FIGS. 2-4. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 2-4 can be performed or utilized by way of a processing unit or units and system memory such as those indicated, respectively, at 16 and 28 in FIG. 1, whether on a server computer, a client computer, a node computer in a distributed network, or any combination thereof.

To facilitate easier reference, in advancing from FIG. 2 to and through FIG. 4, a reference numeral is advanced by a multiple of 100 in indicating a substantially similar or analogous component or element with respect to at least one component or element found in one or more earlier figures among FIGS. 2-4.

To further facilitate reference among FIGS. 2-4, and generally to avoid confusion, hierarchical relationships (i.e., parent-child) are illustrated with solid arrows while dotted lines extend from reference numerals towards the elements to which the numerals refer.

To help illustrate aspects of a context of at least one embodiment of the invention, in FIG. 2 there is depicted a graph of a sample semi-structured document 202, while FIG. 3 provides a graph of a general sample map-reduced hierarchical data scheme. Returning to FIG. 2, child 206 of the root 204 is a directory, containing word entries 207 with words (207a) and their corresponding weights (207b). Child 208 provides news stories (209) divided by topic, where each news story 209 has several documents 209a related to it along with a time stamp (as indicated along with document contents at 209b). Child 210 provides an array of blog entries 210a along with a timestamp for each blog (as indicated along with blog entry contents at 210b).

Typically, a map-reduce framework admits a key-value pair defined on given input data, produces intermediate key-value pairs and finally produces the aggregated output. This assumption works well if key-value pairs can be created independently of each other, which often prevails in the case of structured data where each row in, e.g., a table of data is represented in all columns. Such data may be explicitly structured or semi-structured data may be organized in structured format with strict record boundaries. However, hierarchical data (e.g., such as in document 202) not following such assumptions may induce complications for data processing in a map-reduce environment. For instance, a hierarchical data document (such as 202) can be very large, which is often the case with web data. Also, data needed for producing a key-value pair may be distributed in several different places (e.g., different levels of hierarchy) in the document, wherein the amount of such diffusely distributed data needed to produce a key-value pair could well be much larger than HDFS (Hadoop Distributed File System) block size threshold.

Broadly contemplated herein, in accordance with at least one embodiment of the invention, are methods and arrangements for processing hierarchical or semi-structured data in map-reduce environment, especially without regard to the size or amount of the hierarchical input data. This can be of great benefit in processing data generated on the web, as it often is in a semi-structured format.

With such a scheme, it is very difficult if not impossible to perform map side data processing in parallel. However, again referring to document 202 as an example, if the input data is modified by first partitioning the data at each "News" node 209, with small header information ("word" nodes 207) and each "News" node 209 copied under a dummy root, map side processing can be run in parallel. On the other hand, if a query involves computing the most popular news stories in a collection of blogs (i.e., the story which has maximum number of related blogs), words inside "Blog" nodes 210 would be joined with words inside "News" nodes 209.

Accordingly, and referring now to FIG. 3, in accordance with at least one embodiment of the invention, the key-value input to the map function would be {wordj, (docID, BlogID)} (as indicated at 307, 309a and 310a, respectively.) Assuming both 'News' and 'Blogs' node trees are sufficiently big in size, copying the data would involve a much more expensive operation compared to changing the job. Hence, and as an alternative, instead of trying to copy an entire "Blog" tree inside a "News" tree (or vice versa), the job can be changed by introducing one intermediate job to produce the desired output. The input key value pair will accordingly change to elements {word, docID} and {word, BlogID}, with these elements to be joined later.

In accordance with at least one embodiment of the invention, it can also be recognized, that in instances, both data partitioning and job re-design may be needed to process a job, e.g., when a query needs to act on a big hierarchical data tree in a map-reduce environment. For instance, if a query involves computing the most popular news stories in terms of weight, as given in a "Directory" sub-tree (see 206/207/207a/ 207b in FIG. 2), while searching in the collection of blogs (using "Directory" and "News" sub-trees) then the input key-value pair to the map function would be: {wordj, (weightj, docId, blogId)}.

Accordingly, in accordance with at least one embodiment of the invention, in this scenario data is partitioned (e.g., in the case of a tree size bigger than a data threshold, such as a HDFS block size, that can be processed at the map side), the original job definition is changed and an intermediate reduce step is added to join the data. Such steps are indicated in FIG. 4, where original document 402 is partitioned into new partitioned documents 412 and 420. In the partitioning, some data is duplicated in both documents 412 and 420. Thus, in the first partitioned document 412, a replicated root node 414c appears along with a replicated Directory node 416c with word nodes 417c. A News node is absent, while a replicated Blog entry node 418 is present (along with any descendant nodes thereof). The second partitioned document 420 also contains a replicated root node 414d along with a replicated Directory node 416d and word nodes 417d. However, here a Blog entry node is absent, while a replicated News node 424 is present along with DocID nodes 424a (and any descendant nodes thereof). Thus, this represents a hybrid approach where Directory nodes are copied into each partition 412/420 while the job is also changed to process Blog entry nodes and News nodes separately.

Consequently, there is broadly contemplated herein, in accordance with at least one embodiment of the invention, in the context of a map reduce job defined on hierarchical data, and a data block size threshold of W in a map-reduce environment, a redesign of the data and/or the corresponding job such that the partition size for all stages of map and reduce in a redefined job is within the threshold size of W. Presented here below is an example dynamic programming based algorithm to redefine the job defined on hierarchical data such that it runs in a map reduce environment which has block size constraints.

In such an algorithm in accordance with at least one embodiment of the invention, a job cost is defined as being proportional to the data to be processed. Using the example presented in FIG. 4 for illustration purposes, it can be assumed that the size of the original document portion containing Directory nodes 406 is x and that the size of the original data is O. Further it can be assumed that are a total of N map jobs. Hence, when the data is copied to partitions 412/420 in each partition as described above, the total size of the data that needs to be processed is:

$$O-x+Nx$$

Thus, in accordance with an algorithm in accordance with at least one embodiment of the invention, the cost of the job can be considered to be proportional to the data size, i.e., $O+(N-1)x$.

On the other hand, in accordance with at least one embodiment of the invention, job can be modified such that there will be additional processing to collect the data before passing it to the final reduce stage. The total processing cost then becomes $O+y$, where y is the size of the data that is processed additionally.

Continuing, in accordance with an algorithm in accordance with at least one embodiment of the invention, if $(N-1)x<y$, then the smaller data portion (or "chunk") is copied into each partition 412/420 Otherwise, the job definition is changed by introducing the additional intermediate processing. In other words, as can be seen from seen from the equation immediately above, if the portion or chunk to be copied is small compared to the intermediate data size ($x<<y$), thereby ensuring that $(N-1)x<y$, then the portion is copied. Otherwise, the data is partitioned, and the job also is redefined, via introducing a new dummy key. Either way, an objective is accomplished of minimizing the cost of processing a job. With two data paths, it can be appreciated that a greedy approach is employed to minimize processing costs, while in the case of at least two data paths in a job, it is non-trivial to decide an optimal way of executing the job.

For instance, in accordance with an example embodiment of the present invention, let it be assumed that both Directory and Blog entry nodes (406/410a) are relatively small in size. The job then needs to process both Directory and Blog entry nodes (406/410a) to produce intermediate tuples. Let it be assumed that both node types can be copied into each News node 409. Thus, there would now be several options towards deciding an optimal cost of processing, e.g., copy only a Directory node 406, copy only a Blog entry node 410a, copy both Directory (406) and Blog entry (410a) nodes to each News node 409, or partition the News nodes 409 from the rest of the tree (402). Each of these options will result in a different running cost, thus allowing one to choose the option that is most cost-effective.

Accordingly, in accordance with at least one embodiment of the invention, and with continued reference to the present illustrative example, an objective is to partition original data (402) such that the size of each partition (412, 420) is less than W. It also should be ensured that partitions should be such that total processing cost is minimal. Let it be assumed, then, that there are a total of n possible data paths in hierarchical data. An n-by-W matrix M can then be defined such that M[i, w] is the optimal partitioning of a job with i data paths, where a size of a partition is w. (Partition size is determined here as being the size of the maximum data partition, in bytes, among all the partitions.) It should be ensured that, after redefining the job, each partitioned data size is less than W, where W is the size of the data in bytes. Accordingly, M[n,W] will have an optimal job processing schedule, where $0<i<n+1$ and $0<w<W+1$.

Continuing, in accordance with at least one embodiment of the invention, at each step job processing is decided using the following recursive equation:

$$M[i,w]=\min(M[i-1,w],ci1+M[i,w-wi],ci2+M[i,w-wi])$$

Here, $ci1$ is the copying cost while $ci2$ is the processing cost if data is partitioned for the data path under consideration. A matrix D[i,w] is maintained which stores the status of each data path until that point, or with respect to the number of data paths considered so far. In other words, when considering cell (i,w) of matrix M, i paths have been considered so far. The "status" of a data path refers to the state of a decision regarding a path (e.g., whether it should be partitioned out, or the data under that path should be copied into all other partitions, or the path should just be left untouched). Matrix M provides a cost as per the dynamic programming equation immediately above ("M[i,w]= . . . "), whereas matrix D stores the status (e.g., partitioned, copied or left untouched) regarding the paths up to that point (e.g., up to first i paths which are considered so far). Once these steps are complete, the data are partitioned as per the status stored in matrix D while simultaneously ensuring that each partition is of maximum size W. Finally, the data is redesigned and the job is carried out as per the optimal schedule suggested by the results of the algorithm.

As discussed hereinabove, in at least one embodiment of the invention, data can be partitioned into multiple files where each file comprises one partition of the data. In accordance with at least one variant embodiment of the invention, one file can be provided as input, in the context of a format or implementation wherein data can be used to generate key-value pairs independently by each mapper function, that is, without communicating with other nodes in the cluster.

Figure 5:
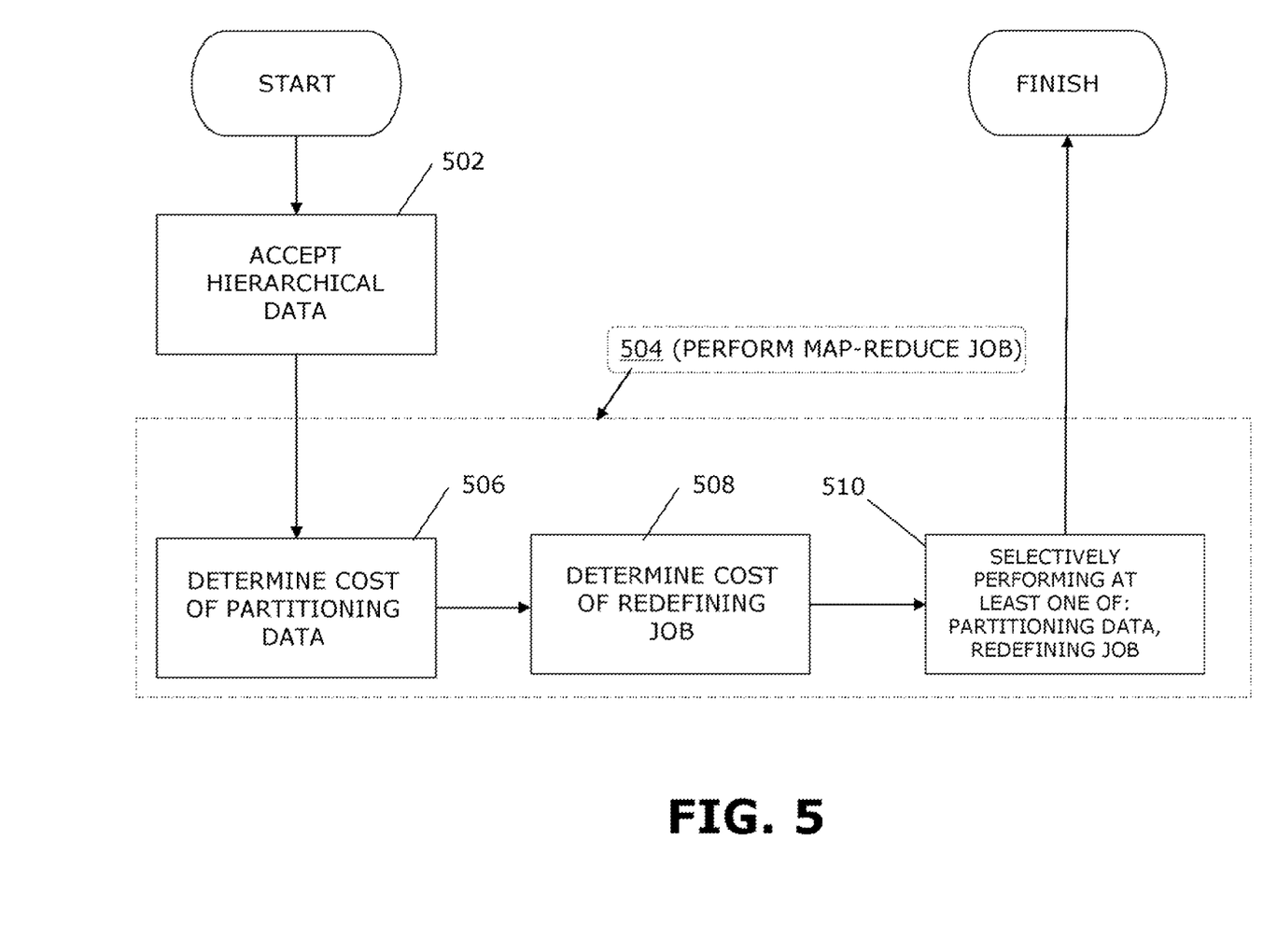
FIG. 5 sets forth a process more generally for processing hierarchical data in a map-reduce framework.

FIG. 5 sets forth a process more generally for processing hierarchical data in a map-reduce framework, in accordance with at least one embodiment of the invention. It should be appreciated that a process such as that broadly illustrated in FIG. 5 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 5 can be performed by way a processing unit or units and system memory such as those indicated, respectively, at 16 and 28 in FIG. 1.

As shown in FIG. 5, hierarchical data is accepted (502), and a map-reduce job is performed on the hierarchical data (504). This performing of a map-reduce job includes determining a cost of partitioning the data (506), determining a cost of redefining the job (508) and thereupon (510) selectively performing at least one step taken from the group consisting of: partitioning the data and redefining the job.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   accepting hierarchical data;
   performing a map-reduce job on the hierarchical data;
   said performing comprising:
   determining a cost of partitioning the data;
   determining a cost of redefining the job;
   thereupon selectively performing at least one step taken from the group consisting of: partitioning the data and redefining the job.

2. The method according to claim 1, wherein said determining of a cost of partitioning the data comprises determining costs associated with at least two different processes of partitioning the data.

3. The method according to claim 1, wherein said determining of a cost of redefining the job comprises determining a cost of copying data to a partition of data.

4. The method according to claim 1, wherein said accepting comprises accepting hierarchical data without restrictions on a number of levels of the hierarchical data.

5. The method according to claim 1, wherein:
   said partitioning of data is performed, wherein the data is partitioned into at least two partitions; and
   each of the at least two partitions is of a size less than or equal to a predetermined threshold size.

6. The method according to claim 1, wherein said performing of a map-reduce job comprises performing a multi-stage map-reduce job comprising a plurality of stages, the plurality of stages including an intermediate map-reduce job stage and a final map-reduce job stage.

7. The method according to claim 6, further comprising accepting new hierarchical input data at the intermediate map-reduce job stage.

8. The method according to claim 7, wherein said partitioning of data is performed.

9. The method according to claim 8, wherein said partitioning comprises copying a data portion to a partition of data if the portion is smaller than a size of the new hierarchical input data, wherein the size of the data portion times (N−1) is less than the size of the new hierarchical input data, with N representing a total number of map-reduce jobs.

10. The method according to claim 8, wherein said redefining of the job is performed.

11. The method according to claim 10, further comprising introducing an element at the intermediate map-reduce stage which triggers said redefining of the job and said partitioning of data.

12. The method according to claim 8, wherein said partitioning of data comprises:
   creating a matrix to store a status of each data path up to a current processing point; and
   consulting the matrix in partitioning the data.

* * * * *